United States Patent
Apostolo et al.

(10) Patent No.: US 6,710,132 B2
(45) Date of Patent: Mar. 23, 2004

(54) FLUOROELASTOMERIC COMPOSITIONS

(75) Inventors: Marco Apostolo, Novara (IT); Margherita Albano, Milan (IT); Stefano Arrigoni, Novara (IT)

(73) Assignee: Ausimont S.p.A., Milan (IT)

( * ) Notice: Subject to any disclaimer, the term of this patent is extended or adjusted under 35 U.S.C. 154(b) by 65 days.

(21) Appl. No.: 10/151,959

(22) Filed: May 22, 2002

(65) Prior Publication Data

US 2002/0193525 A1 Dec. 19, 2002

(30) Foreign Application Priority Data

May 22, 2001 (IT) .................................. MI2001A1061

(51) Int. Cl.[7] .......................... C08L 27/12; C08L 27/18; C08L 51/00; C08L 285/00
(52) U.S. Cl. ........................................ 525/199; 524/805
(58) Field of Search ........................... 525/199; 524/805

(56) References Cited

U.S. PATENT DOCUMENTS

| | | | | |
|---|---|---|---|---|
| 452,630 A | * | 5/1891 | Morgan et al. ................. 14/43 |
| 4,035,565 A | | 7/1977 | Apotheker et al. .......... 526/249 |
| 4,243,770 A | | 1/1981 | Tatemoto et al. ............ 525/331 |
| 4,281,092 A | | 7/1981 | Breazeale .................... 526/247 |
| 4,564,662 A | | 1/1986 | Albin ........................... 526/247 |
| 4,694,045 A | | 9/1987 | Moore ........................... 525/276 |
| 4,745,165 A | | 5/1988 | Arcella et al. ................. 526/247 |
| 4,789,717 A | | 12/1988 | Giannetti et al. ............. 526/209 |
| 4,864,006 A | | 9/1989 | Giannetti et al. ............. 526/209 |
| 4,943,622 A | | 7/1990 | Naraki et al. ................. 526/206 |
| 5,173,553 A | | 12/1992 | Albano et al. ................. 526/238 |
| 5,447,993 A | | 9/1995 | Logothetis ................... 525/273 |
| 5,523,346 A | | 6/1996 | Wu ................................ 524/805 |
| 5,616,648 A | | 4/1997 | Wu ................................ 524/805 |
| 5,625,019 A | | 4/1997 | Arcella et al. ................ 526/247 |
| 5,789,489 A | | 8/1998 | Coughlin et al. ............. 525/370 |
| 6,310,142 B1 | * | 10/2001 | Apostolo et al. ............ 525/200 |
| 6,395,834 B1 | * | 5/2002 | Albano et al. ............... 525/199 |

FOREIGN PATENT DOCUMENTS

| | | |
|---|---|---|
| EP | 0 136 596 A2 | 4/1965 |
| EP | 0 199 138 A2 | 10/1986 |
| EP | 0 410 351 A1 | 1/1991 |
| EP | 0 683 186 A | 11/1995 |
| EP | 0 769 520 A1 | 4/1997 |
| EP | 0 661 304 B1 | 10/1997 |
| EP | 0 708 797 B1 | 2/1998 |
| EP | 0 969 027 A1 | 1/2000 |
| EP | 0 979 832 A1 | 2/2000 |
| EP | 1 031 606 A1 | 8/2000 |
| EP | 1 031 606 A | 8/2000 |
| EP | 1 031 607 A | 8/2000 |
| WO | WO 97/05122 | 2/1997 |

* cited by examiner

*Primary Examiner*—Nathan M. Nutter
(74) *Attorney, Agent, or Firm*—Arent Fox Kintner Plotkin & Kahn PLLC

(57) ABSTRACT

Fluoroelastomeric compositions comprising:
A) a fluoroelastomeric matrix based on tetrafluoroethylene (TFE);
B) a semi-crystalline fluoropolymer, in an amount from 2 to 90% by weight based on the total of A)+B), comprising a semi-crystalline fluoropolymer core coated by a semi-crystalline fluoropolymer shell containing bromine and/or iodine in the polymer chain;
the fluoroelastomer A) incorporates the fluoropolymer B), the fluoropolymer B) being formed by tetrafluoroethylene (TFE) homopolymers, or by TFE copolymers with one or more monomers containing at least one unsaturation of ethylene type, the average sizes of the semi-crystalline fluoropolymer particles being from 10 to 100 nm, preferably from 10 to 60 nm.

12 Claims, No Drawings

FLUOROELASTOMERIC COMPOSITIONS

The present invention relates to (per)fluoroelastomeric compositions consisting essentially of a perfluoroelastomer and of a semi-crystalline fluoropolymer, having improved chemical, thermal, sealing resistance, lower fluid permeability, in particular hydrocarbons, combined with good mechanical properties and usable in the preparation of sealing manufactured articles, in particular for electronic, optical, pharmaceutical and oil industry.

Specifically, the present invention relates to (per)fluoroelastomeric compositions comprising a perfluoroelastomeric matrix which incorporates semi-crystalline fluoropolymer particles, wherein the semi-crystalline fluoropolymer is coated by a semi-crystalline fluoropolymer shell containing bromine and/or iodine in the polymer chain, said compositions characterized by improved-mechanical and sealing properties combined with improved surface aspect (absence of roughnesses).

It is known from the European patent application EP 1,031,606 to prepare (per)fluoroelastomeric compositions obtained by incorporation under the latex form of a semi-crystalline fluoropolymer containing iodine and/or bromine atoms, in a (per)fluoroelastomer to improve the mechanical properties with respect to a (per)fluoroelastomer filled with PTFE powder. The particles of the semi-crystalline fluoropolymer latex have sizes comprised between 10 and 100 nm. In said patent application it is stated that the use of a semi-crystalline fluoropolymer latex containing iodine and/or bromine allows to improve the mechanical properties with respect to the case of absence of iodine and/or bromine. In the Examples the introduction of iodine atoms by using iodinated transfer agents is reported. In said patent application it is stated that iodine and/or bromine can be introduced by using comonomers containing iodine and/or bromine in the preparation of the semi-crystalline fluoropolymer. The comonomer content in the final compound results lower than 2 moles per 100 moles of the other monomeric units of the semi-crystalline fluoropolymer. No Examples of compositions containing semi-crystalline fluoropolymers having iodinated and/or brominated comonomers are reported.

The need was felt to have available (per)fluoroelastomeric compositions having a better combination of properties:
- improved mechanical properties, preferably combined with an improved compression set;
- homogeneity of the mechanical properties on the whole manufactured article;
- improved chemical and thermal resistance;
- excellent surface aspect, roughnesses free;
- working easiness in equipments conventionally used in the fluoroelastomer field, without using complicated technologies for incorporation of fluoropolymer.
- lower permeability to fluids, in particular hydrocarbons.

The Applicant has unexpectedly and surprisingly found that it is possible to obtain the improved combination of the above properties by using the specific compositions defined hereunder.

An object of the present invention are therefore (per)fluoroelastomeric compositions comprising:
A) a perfluoroelastomeric matrix based on tetrafluoroethylene (TFE);
B) a semi-crystalline fluoropolymer, in an amount from 2 to 90% by weight based on the total of A)+B), comprising a semi-crystalline fluoropolymer core coated by a semi-crystalline fluoropolymer shell containing bromine and/or iodine in the polymer chain, the amount of brominated and/or iodinated comonomer being from >2% to 10% by moles per 100 moles of the other basic monomeric units of the semi-crystalline fluoropolymer B) core+shell; the fluoroelastomer A) incorporates the fluoropolymer B), the fluoropolymer B) being formed by tetrafluoroethylene (TFE) homopolymers, or TFE by copolymers with one or more monomers containing at least one unsaturation of ethylene type, in an amount from 0.01% to 10% by moles, preferably from 0.05% to 7% by moles; the core and the shell of the fluoropolymer B) can be of a different composition between each other, the average sizes of the particles of the semi-crystalline fluoropolymer being from 10 to 100 nm, preferably from 10 to 60 nm.

The (per)fluoroelastomeric compositions of the invention are obtainable by mixing the latex of the semi-crystalline fluoropolymer B) with the latex of the perfluoroelastomer A) and subsequent coagulation.

Alternatively to the latex mixing, the (per)fluoroelastomeric compositions of the invention can be obtained in the same reactor, using two subsequent steps: in the first step the semi-crystalline fluoropolymer B) having the above nanometric sizes is polymerized, while in the second step the perfluoroelastomer A) is polymerized. By operating in this way the perfluoroelastomer A) covers the latex particles of semi-crystalline fluoropolymer B) allowing to obtain a very good disperdibility of the latter in the perfluoroelastomer.

The semi-crystalline fluoroelastomer B) amount incorporated in the (per)fluoroelastomeric matrix is preferably from 5% to 80% by weight based on the total weight of the polymer mixture, more preferably from 10 to 70% by weight.

The semi-crystalline fluoropolymer B) particles having the mentioned nanometric sizes are obtainable for example by polymerization in aqueous microemulsion of perfluoropolyoxyalkylenes as described for example in the European patent application 969,027 in the name of the Applicant, herein incorporated by reference. Polymerization techniques in microemulsion wherein the oil phase is formed by polymerizable unsaturated monomers can also be used, as described in U.S. Pat. Nos. 5,523,346 and 5,616,648.

The Applicant has found that in order to obtain the results of the invention it is essential that the semi-crystalline fluoropolymer B) has the mentioned nanometric sizes, while the size of the perfluoroelastomer A) particles to be mixed with the fluoropolymer is not critical.

The semi-crystalline fluoropolymers of the present invention comprise a semi-crystalline fluoropolymer core shelled by a semi-crystalline fluoropolymer containing in the polymer chain bromine and/or iodine atoms. The introduction of said bromine and/or iodine atoms can be carried out by addition in the polymerization mixture of the (co)monomers forming the fluoropolymer B), of brominated and/or iodinated comonomers, such as bromo- and/or iodo-olefins having from 2 to 10 carbon atoms, as described for example in U.S. Pat. Nos. 4,035,565 and 4,694,045, 5,625,019, or bromo and/or iodo fluoroalkylvinylethers, as described in U.S. Pat. Nos. 4,745,165, 4,564,662 and EP 199,138, in such amounts whereby the content of brominated and/or iodinated comonomers in the final polymer B) is generally from >2 to 10% by moles per 100 moles of the other basic monomeric units as above said, preferably from 2.5 to 6%.

Optionally, in combination with said comonomers, it is possible to introduce bromine and/or iodine end atoms by addition to the reaction mixture of brominated and/or iodinated polymer chain transfer agents, as for example described in U.S. Pat. Nos. 4,243,770 and 4,943,622, 5,173,553.

It has been unexpectedly found by the Applicant, see the comparative Examples, that the combination of properties of the invention compositions is obtainable only if the semicrystalline fluoropolymer B) is prepared by using on the fluoropolymer shell a brominated and/or iodinated comonomer in an amount higher than 2% by moles with respect to the other basic monomeric units as above said. Tests carried out by the Applicant have shown that by operating under the conditions reported in the Examples of European patent application 1,031,606, wherein the semi-crystalline fluoropolymer does not contain bromine and/or iodine in the polymer chain but only on the polymer chain end groups, the improved combination of the above properties is not obtained.

By semi-crystalline fluoropolymer a fluoropolymer is meant which shows, besides the glass trnsition temperature Tg, at least one melting temperature.

The preparation of the perfluoroelastomers A) of the composition of the present invention can be carried out by copolymerization of the monomers in aqueous emulsion, according to known methods of the prior art, in the presence of radical initiators, such as for example alkaline or ammonium persulphates, perphosphates, perborates or percarbonates, optionally in combination with ferrous, cuprous or silver salts, or of other easily oxidizable metals. In the reaction medium also surfactants of various types are usually present, among which fluorinated surfactants are particularly preferred.

The polymerization reaction is generally carried out at temperatures in the range 25°–150° C., under a pressure up to 10 MPa.

The preparation of the perfluoroelastomeric matrix is preferably carried out in microemulsion of (per)fluoropolyoxyalkylenes, according to U.S. Pat. Nos. 4,789,717 and 4,864,006.

When the semi-crystalline fluoropolymer B) present in the (per)fluoroelastomeric compositions of the invention is based on modified PTFE, for its preparation comonomers having an ethylene unsaturation both of hydrogenated and fluorinated type can be used. Among the hydrogenated ones, ethylene, propylene, acrylic monomers, for example methylmethacrylate, (meth)acrylic acid, butylacrylate, hydroxyethylhexylacrylate, styrene monomers can be mentioned.

Among fluorinated comonomers, it can be mentioned:

$C_3$–$C_8$ perfluoroolefins, such as hexafluoropropene (HFP), hexafluoroisobutene;

$C_2$–$C_8$ hydrogenated fluoroolefins, such as vinyl fluoride (VF), vinylidene fluoride (VDF), trifluoroethylene, perfluoroalkylethylene $CH_2$=CH—$R_f$, wherein $R_f$ is a $C_1$–$C_6$ perfluoroalkyl;

$C_2$–$C_8$ chloro-fluoroolefins, such as chlorotrifluoroethylene (CTFE);

(per)fluoroalkylvinylethers (PAVE) $CF_2$=CFOR$_f$, wherein $R_f$ is a $C_1$–$C_6$ (per)fluoroalkyl, for example $CF_3$, $C_2F_5$, $C_3F_7$;

(per)fluoro-oxyalkylvinylethers $CF_2$=CFOX, wherein X is: a $C_1$–$C_{12}$ alkyl, or a $C_1$–$C_{12}$ oxyalkyl, or a $C_1$–$C_{12}$ (per)-fluoro-oxyalkyl having one or more ether groups, for example perfluoro-2-propoxy-propyl; fluorodioxoles, preferably perfluorodioxoles;

fluorovinylethers (MOVE) of general formula $CFX_{AI}$=$CX_{AI}OCF_2OR_{AI}$ (A-I) wherein $R_{AI}$ is a $C_2$–$C_6$ linear, branched, or $C_5$–$C_6$ Cyclic (per)fluoroalkyl group, or a $C_2$–$C_6$ linear, branched (per)fluorooxyalkyl group containing from one to three oxygen atoms; when $R_{AI}$ is a fluoroalkyl or a fluorooxyalkyl group as above defined it can contain from 1 to 2 atoms, equal or different, selected from the following: H, Cl, Br, I; $X_{AI}$=F, H; the compounds of general formula $CFX_{AI}$=$CX_{AI}OCF_2OCF_2CF_2Y_{AI}$ (A-II) wherein $Y_{AI}$=F, $OCF_3$; $X_{AI}$ as above are preferred; in particular (MOVE I) $CF_2$—$CFOCF_2OCF_2CF_3$ (A-III) and (MOVE II) $CF_2$—$CFOCF_2OCF_2CF_2OCF_3$ (A-IV) are preferred.

PAVEs, in particular perfluoromethyl-, ethyl-, propylvinylether, MOVEs, in particular MOVE I and MOVE II, and fluorodioxoles, preferably perfluorodioxoles, are preferred comonomers.

The perfluoroelastomers A) used in the present invention are TFE-based copolymers, wherein TFE is copolymerized with at least a comonomer selected from the following:

(per)fluoroalkylvinylethers (PAVE) $CF_2$=CFOR$_f$, wherein $R_f$ is as above;

perfluoro-oxyalkylvinylethers $CF_2$=CFOX, wherein X is as defined;

fluorovinylethers (MOVE) of general formula $CFX_{AI}$=$CX_{AI}OCF_2OR_{AI}$ (A-I) wherein $R_{AI}$ and $X_{AI}$ are as defined;

$C_2$–$C_8$ fluoroolefins containing hydrogen and/or chlorine and/or bromine and/or iodine atoms;

perfluorovinylethers containing hydrocyanic groups as described in U.S. Pat. Nos. 4,281,092, 5,447,993, 5,789,489.

Preferred compositions by moles of the monomers which form the basic structure of the perfluoroelastomer, are the following, being 100% the sum of the monomer percentages;

tetrafluoroethylene (TFE) 50–80%, perfluoroalkylvinylether (PAVE) and/or fluorovinylethers (MOVE) 15–55%.

Particularly preferred specific compositions of monomer blends are the following, being 100% the sum of the percentages of the comonomers:

TFE 50–80%, PAVE 20–50%;
TFE 50–80%, MOVE I 20–50%;
TFE 50–80%, MOVE II 20–50%;
TFE 50–80%, PAVE 5–30%, MOVE I 5–30%;
TFE 50–80%, PAVE 5–30%, MOVE II 5–30%;

Optionally the perfluoroelastomeric matrix comprises also monomeric units deriving from a bis-olefin having general formula:

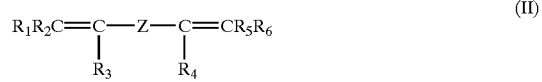

(II)

wherein:

$R_1$, $R_2$, $R_3$, $R_4$, $R_5$, $R_6$, equal to or different from each other, are H or $C_1$–$C_5$ alkyls;

Z is a $C_1$–$C_{18}$ linear or branched alkylene or cycloalkylene radical, optionally containing oxygen atoms, preferably at least partially fluorinated, or a (per)fluoropolyoxyalkylene radical, as described in EP 661,304 in the name of the Applicant.

The amount of units in the polymer chain deriving from said bis-olefins is generally in the range 0.01–1.0% by moles, preferably 0.03–0.5% by moles, still more preferably 0.05–0.2% by moles per 100 moles of the other above mentioned monomeric units which form the basic structure of the perfluoroelastomer.

The (per)fluoroelastomers of the invention are cured by peroxidic route, whereby the perfluoroelastomer A) preferably contains in the polymer chain and/or in terminal position of the macromolecules iodine and/or bromine atoms. The introduction in the perfluoroelastomeric matrix of said iodine and/or bromine atoms can be obtained by addition of brominated and/or iodinated "cure-site" comonomers, such as bromo and/or iodo olefins having from 2 to 10 carbon atoms, as described for example in U.S. Pat. Nos. 4,035,565 and 4,694,045, or of iodo and/or bromo fluoroalkylvinylethers, as described in U.S. Pat. Nos. 4,745, 165, 4,564,662 and EP 199,138, in such amounts that the cure-site comonomer content in the final compound is generally in the range 0.05–4 moles per 100 moles of the other basic monomeric units.

Other usable iodinated compounds are the triiodinated ones derived from triazines as described in European patent application EP 860,436 and in European patent application 979,832.

In alternative or also in combination with the "cure-site" comonomers, it is possible to introduce in the perfluoroelastomer iodine and/or bromine end atoms by addition to the reaction mixture of iodinated and/or brominated polymer chain transfer agents, such as for example the compounds of formula $R_f(I)_x(Br)_y$, wherein $R_f$ is a (per)fluoroalkyl or a (per)fluorochloroalkyl having from 1 to 8 carbon atoms, while x and y are integers comprised between 0 and 2, with $1 \leq x+y \leq 2$ (see for example U.S. Pat. Nos. 4,243,770 and 4,943,622). It is also possible to use as polymer chain transfer agents iodides and/or bromides of alkaline or alkaline-earth metals, according to U.S. Pat. No. 5,173,553.

In combination with the polymer chain transfer agents containing iodine and/or bromine, other polymer chain transfer agents known in the prior art, such as ethyl acetate, diethylmalonate, etc., can be used.

Curing by peroxidic route is carried out, according to known techniques, by addition of a suitable peroxide capable to generate radicals by thermal decomposition. Among the most commonly used we remember: dialkyl peroxides, such as for example di-terbutyl-peroxide and 2,5-dimethyl-2,5-di (terbutylperoxy)hexane; dicumyl peroxide; dibenzoyl peroxide; diterbutyl perbenzoate; di [1,3-dimethyl-3-(terbutylperoxy)butyl]carbonate. Other peroxidic systems are described, for example, in European patent applications EP 136,596 and EP 410,351.

To the curing blend other compounds are then added, such as:
(a) curing coagents, in amounts generally in the range 0.5–10%, preferably 1–7% by weight with respect to the polymer; among them there are usually employed: triallylcyanurate; triallyl-isocyanurate (TAIC); tris (diallylamine)-s-triazine; triallylphosphite; N,N-diallylacrylamide; N,N,N',N'-tetraallyl-malonamide; trivinylisocyanurate; 2,4,6-trivinyl-methyltrisiloxane, etc.; TAIC is particularly preferred;
other preferred crosslinking agents are bis-olefins described in EP 769,520.
Other crosslinking agents which can be used are triazines described in European patent application EP 860, 436 and in European patent application WO97/05122;
(b) optionally a metal compound, in amounts in the range 1–15%, preferably 2–10%, by weight with respect to the polymer, selected from oxides or hydroxides of divalent metals, such as for example Mg, Zn, Ca or Pb, optionally combined with a weak acid salt, such as for example stearates, benzoates, carbonates, oxalates or phosphites of Ba, Na, K, Pb, Ca;
(c) optionally acid acceptors of the type non metal oxides such as 1,8 bis dimethyl amino naphthalene, octadecylamine, etc. as described in EP 708,797;
(d) other conventional additives, such as thickening fillers, pigments, antioxidants, stabilizers and the like.

The indicated amounts of the blend components are referred to 100 phr of the (per)fluoroelastomeric composition of the invention.

The present invention will be better illustrated by the following Examples, which have a merely indicative and not limitative purpose of the scope of the invention itself.

EXAMPLE 1

Preparation of an Invention Composition Containing 15% of Semi-Crystalline Fluoropolymer B) Having an Iodinated Comonomer Content Equal to 2.5% by Moles of Comonomer Based on the Total of the Monomeric Units of the Fluoropolymer B)

a) Preparation of the Semi-Crystalline Fluoropolymer B) Latex

In a 10 l autoclave, equipped with stirrer working at 545 rpm, there were introduced, after evacuation, 6.5 l of demineralized water and 260 ml of a microemulsion of perfluoropolyoxyalkylenes previously obtained by mixing:

56.4 ml of a perfluoropolyoxyalkylene having an acid end group of formula:
$CF_2ClO(CF_2-CF(CF_3)O)_n(CF_2O)_mCF_2COOH$ wherein n/m=10, having average molecular weight of 600;

56.4 ml of an aqueous solution of $NH_4OH$ at 30% by volume;

112.8 ml of demineralized water;

34.4 ml of Galden® D02 having the formula:

$$CF_3O(CF_2-CF(CF_3)O)_n(CF_2O)_mCF_3$$

wherein n/m=20, having average molecular weight of 450.

The autoclave was then heated up to 80° C. and maintained at this temperature for the whole reaction. The autoclave was brought to the pressure of 0.6 bar (0.06 MPa) with ethane and then up to the pressure of 20 bar (2 MPa) with a monomeric mixture formed by 6.5% by moles of perfluoromethylvinylether (PMVE) and 93.5% by moles of tetrafluoroethylene (TFE).

0.13 g of ammonium persulphate (APS) were then introduced into the autoclave as initiator. Starting from 75% of the monomer conversion, 170 g (equivalent to 2.5% by moles with respect to the other monomeric units of the fluoropolymer B)) of an iodo-olefin of formula $CH_2=CH-(CF_2)_6I$ are fed in five steps, for every 5% increase of the monomer conversion.

During the reaction the pressure is maintained at 20 bar by continuously feeding the following monomeric mixture: 2% by moles of PMVE and 98% of TFE.

After 180 minutes of reaction, corresponding to 100% of the monomer conversion, the autoclave was cooled and the latex discharged. The latex properties are reported in Table 1.

b) Preparation of the Fluoroelastomer A) Latex

In a 10 l autoclave, equipped with stirrer working at 545 rpm, there were introduced, after evacuation, 6.5 l of demineralized water and 67 ml of a microemulsion of perfluoropolyoxyalkylenes previously obtained by mixing:

14.5 ml of a perfluoropolyoxyalkylene having an acid end group of formula:

$$CF_2ClO(CF_2-CF(CF_3)O)_n(CF_2O)_mCF_2COOH$$

wherein n/m=10, having average molecular weight of 600;

14.5 ml of an aqueous solution of NH$_4$OH at 30% by volume;

29 ml of demineralized water;

9 ml of Galden® D02 having the formula:

$$CF_3O(CF_2-CF(CF_3)O)_n(CF_2O)_mCF_3$$

wherein n/m=20, having average molecular weight of 450.

The autoclave was then heated up to 80° C. and maintained at said temperature for the whole reaction. The following mixture of monomers was then fed:

| perfluoromethylvinylether (PMVE) | 60% by moles |
|---|---|
| tetrafluoroethylene (TFE) | 40% by moles | so as to bring the pressure up to 25 bar.

In the autoclave there were then introduced:

0.32 g of ammonium persulphate (APS) as initiator;

26 g of 1,6-diiodoperfluorohexane (C$_6$F$_{12}$I$_2$) as polymer chain transfer agent;

5 g of bis-olefin of formula CH$_2$=CH—(CF$_2$)$_6$—CH=CH$_2$; the addition was carried out in 20 aliquots, each of 0.25 g starting from the beginning of the polymerization and for every 5% increase in the monomer conversion.

The 25 bar pressure was maintained constant for the whole polymerization by feeding a mixture formed by:

| perfluoromethylvinylether (PMVE) | 40% by moles |
|---|---|
| tetrafluoroethylene (TFE) | 60% by moles |

After 137 minutes of reaction, the autoclave was cooled and the latex discharged. The latex properties are reported in Table 1.

c) Mixing of the Latexes and Preparation of the Invention Composition

The latex obtained in a) was mixed with the latex prepared in b) so as to obtain an amount of semi-crystalline polymer equal to 15% by weight with respect to the total weight of A)+B). After mixing the latex is coagulated with a solution of aluminum sulphate (6 g of Al$_2$(SO$_4$)$_3$ for each liter of latex) and dried at 90° C. in an air circulating oven for 16 hours. 1,000 g of the invention composition were obtained, which was characterized for the mechanical properties in Table 2.

The mixing of the composition of Example 1 with the crosslinking agents was carried out in an open mixer commonly used to mix fluoroelastomers. The plates obtained by moulding of the composition of Example 1 show a very smooth surface, lacking of roughness free.

EXAMPLE 2 COMPARATIVE

Preparation of a Composition Containing 15% of Semi-Crystalline Fluoropolymer B) Not Containing Iodine and/or Bromine a) Preparation of the Semi-Crystalline Fluoropolymer B) Latex In a 10 l autoclave, equipped with stirrer working at 545 rpm there were introduced, after evacuation, 6.5 l of demineralized water and 260 ml of a microemulsion of perfluoropolyoxyalkylenes previously obtained by mixing:

56.4 ml of a perfluoropolyoxyalkylene having an acid end group of formula:

$$CF_2ClO(CF_2-CF(CF_3)O)_n(CF_2O)_mCF_2COOH$$

wherein n/m=10, having average molecular weight of 600;

56.4 ml of an aqueous solution of NH$_4$OH at 30% by volume;

112.8 ml of demineralized water;

34.4 ml of Galden® D02 having the formula:

$$CF_3O(CF_2-CF(CF_3)O)_n(CF_2O)_mCF_3$$

wherein n/m=20, having average molecular weight of 450.

The autoclave was then heated up to 80° C. and maintained at said temperature for the whole reaction. The autoclave was brought to the pressure of 0.6 bar (60 Kpa) with ethane and then up to the pressure of 20 bar (2 MPa) with a monomeric mixture formed by 6.5% by moles of perfluoromethylvinylether (PMVE) and 93.5% by moles of tetrafluoroethylene (TFE).

0.13 g of ammonium persulphate (APS) were then introduced into the autoclave as initiator.

During the reaction the pressure is maintained at 20 bar by continuously feeding the following monomeric mixture: 2% by moles of PMVE and 98% of TFE.

After 45 minutes of reaction, the autoclave was cooled and the latex discharged. The latex properties are reported in Table 1.

b) Preparation of the Fluoroelastomer A) Latex

The procedure of Example 1 is repeated.

c) Mixing of the Latexes and Preparation of the Final Composition

The procedure of Example 1 is repeated, obtaining 1,000 g of polymer.

The mechanical properties of the polymer are reported in Table 2.

EXAMPLE 3

Preparation of an Invention Composition Containing 50% of Semi-Crystalline Fluoropolymer B) Having an Iodinated Comonomer Content Equal to 2.5% by Moles of Comonomer Based on the Total of the Monomeric Units of the Fluoropolymer B)

a) Preparation of the Semi-Crystalline Fluoropolymer B) Latex

The procedure of Example 1 is repeated.

b) Preparation of the Fluoroelastomer A) Latex

The procedure of Example 1 is repeated.

c) Mixing of the Latexes and Preparation of the Invention Composition

The latex obtained in a) was mixed with the latex prepared in b) so as to obtain an amount of semi-crystalline polymer equal to 50% by weight with respect to the total weight of A)+B). After mixing the latex is coagulated with a solution of aluminum sulphate (6 g of Al$_2$(SO$_4$)$_3$ for each liter of latex) and dried at 90° C. in an air circulating oven for 16 hours. 1,000 g of the invention composition were obtained, which were characterized for the mechanical properties in Table 2.

The mixing of the composition of Example 1 with the crosslinking agents was carried out in an open mixer commonly used to mix fluoroelastomers. The plates obtained by moulding of the composition of Example 1 show a very smooth surface, roughness free.

TABLE 1

| Examples | solid/ latex (g/l) | Particle diameter (nm) | MFI [1] ASTM D 1238 | Mooney (1 + 10) 121° C. ASTM D1646 |
|---|---|---|---|---|
| 1 | | | | |
| Fluoroel.A | 360 | 68 | — | 40 |
| Polymer B | 200 | 35 | 15 | — |
| 2 comp. | | | | |
| Fluoroel.A | 360 | 68 | — | 40 |
| Polymer B | 200 | 30 | 10 | — |
| 3 | | | | |
| Fluoroel.A | 360 | 68 | — | 40 |
| Polymer B | 200 | 35 | 15 | — |

[1] MET was measured at 372° C. with 2.16 Kg

TABLE 2

| EXAMPLES | | 1 | 2 comp | 3 |
|---|---|---|---|---|
| % by weight polymer B) in A) + B) | | 15 | 15 | 50 |
| Formulation: | | | | |
| Comp. A) + B) | phr | 100 | 100 | 100 |
| Drimix TAIC | " | 1.5 | 1.5 | 1 |
| Luperco 101 XL | " | 2 | 2 | 1 |
| ZnO | " | 5 | 5 | 5 |
| ODR (177° C., 12' Arc 3°) (ASTM D2084-81): | | | | |
| ML | Lbf. in. | 7.5 | 8 | 8 |
| MH | " | 124 | 118 | 148 |
| Ts2 | sec | 41 | 45 | 46 |
| T' 90 | " | 98 | 111 | 103 |
| Mechanical properties after post-cure at 230° C. for 1 + 4 h (ASTM D412-83) | | | | |
| M100 | Mpa | 5.1 | 4.3 | 5.3 |
| Stress at break | " | 20 | 19.2 | 22 |
| Elong. at break | % | 190 | 184 | 258 |
| Shore A hardness | | 68 | 60 | 95 |
| Compression set 200° C. for 70 h | | | | |
| O-ring (ASTM D 395) | % | 30 | 35 | |

What is claimed is:

1. (Per)fluoroelastomeric compositions comprising:
    A) a perfluoroelastomeric matrix based on tetrafluoroethylene (TFE);
    B) a semi-crystalline fluoropolymer, in an amount from 2 to 90% by weight based on the total of A)+B), comprising a semi-crystalline fluoropolymer core coated by a semi-crystalline fluoropolymer shell containing bromine and/or iodine in the polymer chain, the amount of brominated and/or iodinated comonomer being from >2% to 10% by moles per 100 moles of the other basic monomeric units of the semi-crystalline fluoropolymer b) core+shell;
    the perfluoroelastomer A) incorporates the fluoropolymer B), the fluoropolymer B) being formed by tetrafluoroethylene (TFE) homopolymers, or by the copolymers with one or more monomers containing at least one unsaturation of ethylene type, in an amount from 0.01% to 10% by moles, preferably from 0.05% to 7% by moles; the core and the shell of the fluoropolymer B) can be of different composition between each other, the average sizes of the semi-crystalline fluoropolymer particles being from 10 to 100 nm, preferably from 10 to 60 nm.

2. (Per)fluoroelastomeric compositions according to claim 1, wherein the semi-crystalline fluoropolymer B) amount incorporated in the (per)fluoroelastomeric matrix is in the range 5%–80% by weight based on the total of the polymer mixture, preferably 10%–70% by weight.

3. Compositions according to claim 1, wherein the semi-crystalline fluoropolymer B) comprises comonomers having an ethylene unsaturation both of hydrogenated and fluorinated type.

4. Compositions according to claim 3, wherein the fluorinated comonomers are selected from the following:
    $C_3$–$C_8$ perfluoroolefins, preferably hexafluoropropene (HFP), hexafluoroisobutene;
    $C_2$–$C_8$ hydrogenated fluoroolefins, preferably vinyl fluoride (VF), vinylidene fluoride (VDF), trifluoroethylene, perfluoroalkylethylene $CH_2$=CH—$R_f$, wherein $R_f$ is a $C_1$–$C_6$ perfluoroalkyl;
    $C_2$–$C_8$ chloro-fluoroolefins, preferably chlorotrifluoroethylene (CTFE);
    (per)fluoroalkylvinylethers (PAVE) $CF_2$=$CFOR_f$, wherein $R_f$ is a $C_1$–$C_6$ (per)fluoroalkyl, preferably $CF_3$, $C_2F_5$, $C_3F_7$;
    (per)fluoro-oxyalkylvinylethers $CF_2$=CFOX, wherein X is: $C_1$–$C_{12}$ alkyl, or $C_1$–$C_{12}$ oxyalkyl, or $C_1$–$C_{12}$ (per)fluoro-oxyalkyl having one or more ether groups, preferably perfluoro-2-propoxy-propyl; fluorodioxoles, more preferably perfluorodioxoles; fluorovinylethers (MOVE) of general formula $CFX_{AI}$=$CX_{AI}OCF_2OR_{AI}$ (A-I) wherein $R_{AI}$ is a $C_2$–$C_6$ linear, branched or $C_5$–$C_6$ cyclic (per)fluoroalkyl group, or a $C_2$–$C_6$ linear, branched (per)fluorooxyalkyl group containing from one to three oxygen atoms; when $R_{AI}$ is a fluoroalkyl or a fluorooxyalkyl group as above defined it can contain from 1 to 2 atoms, equal or different, selected from the following: H, Cl, Br, I; $X_{AI}$=F, H; the compounds of general formula $CFX_{AI}$=$CX_{AI}OCF_2OCF_2CF_2Y_{AI}$ (A-II) wherein $Y_{AI}$=F, $OCF_3$; $X_{AI}$ as above, are preferred; more preferably (MOVE I) $CF_2$=$CFOCF_2OCF_2CF_3$ (A-III) and (MOVE II) $CF_2$=$CFOCF_2OCF_2CF_2OCF_3$ (A-IV) are selected.

5. Compositions according to claim 4, wherein the comonomers are selected among PAVES, preferably perfluoromethyl-, ethyl-, propylvinylether, MOVES, preferably MOVE I and MOVE II, and fluorodioxoles, preferably perfluoro-dioxoles.

6. Compositions according to claim 1, wherein the perfluoroelastomers A) are TFE-based copolymers, wherein TFE is copolymerized with at least a comonomer selected from the following:
    (per)fluoroalkylvinylethers (PAVE) $CF_2$=$CFOR_f$, wherein $R_f$ is as above;
    perfluoro-oxyalkylvinylethers $CF_2$=CFOX, wherein X is as defined;
    fluorovinylethers (MOVE) of general formula $CFX_{AI}$=$CX_{AI}OCF_2OR_{AI}$ (A-I) wherein $R_{AI}$ and $X_{AI}$ are as defined;
    $C_2$–$C_8$ fluoroolefins containing hydrogen and/or chlorine and/or bromine and/or iodine atoms:

perfluorovinylethers containing hydrocyanic groups.

7. Fluoroelastomeric compositions according to claim 1, wherein the compositions of the monomer blends, expressed as % by moles, which form the basic structure of the fluoroelastomer, are the following, being 100% the sum of the molar percentages of the monomers: tetrafluoroethylene (TFE) 50–80%, perfluoroalkylvinylether (PAVE) and/or fluorovinylethers (MOVE) 15–55%.

8. Fluoroelastomeric compositions according to claim 7, as hereinafter defined, being 100% the sum of the molar percentages of the monomers:

TFE 50–80%, PAVE 20–50%;

TFE 50–80%, MOVE I 20–50%;

TFE 50–80%, MOVE II 20–50%;

TFE 50–80%, PAVE 5–30%, MOVE I 5–30%;

TFE 50–80%, PAVE 5–30%, MOVE II 5–30%.

9. Compositions according to claim 7, wherein the fluoroelastomeric matrix comprises monomeric units deriving from a bis-olefin having general formula:

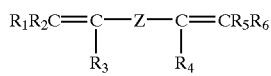

(II)

wherein:

$R_1$, $R_2$, $R_3$, $R_4$, $R_5$, $R_6$, equal to or different from each other, are H or $C_1$–$C_5$ alkyls;

Z is a $C_1$–$C_{18}$ linear or branched alkylene or cycloalkylene radical, optionally containing oxygen atoms, preferably at least partially fluorinated, or a (per) fluoropolyoxyalkylene radical, the amount of the units in the polymer chain deriving from said bis-olefins being in the range 0.01–1.0% by moles, preferably 0.03–0.5% by moles, still more preferably 0.05–0.2% by moles per 100 moles based on the total of the other monomeric units.

10. Fluoroelastomeric compositions according to claims 1, obtainable by mixing of the latex of the semi-crystalline fluoropolymer B) with the latex of the fluoroelastomer A) and subsequent coagulation.

11. Fluoroelastomeric compositions according to claims 1, obtainable in the same reactor, by using two subsequent steps: in the first step the semi-crystalline fluoropolymer B) is polymerized, while in the second step the fluoroelastomer A) is polymerized.

12. Compositions according to claim 1, cured by peroxidic route.

* * * * *